United States Patent
Cassagne et al.

(10) Patent No.: US 10,738,705 B2
(45) Date of Patent: Aug. 11, 2020

(54) METAL FIRE SEALS SYSTEM FOR AIRCRAFT ENGINE MOUNT

(71) Applicant: Airbus Operations SAS, Toulouse (FR)

(72) Inventors: Jérôme Cassagne, Toulouse (FR); Jean Geliot, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 324 days.

(21) Appl. No.: 15/921,870

(22) Filed: Mar. 15, 2018

(65) Prior Publication Data
US 2018/0283280 A1    Oct. 4, 2018

(30) Foreign Application Priority Data
Mar. 28, 2017 (FR) ..................... 17 52584

(51) Int. Cl.
| | | |
|---|---|---|
| F02C 7/25 | (2006.01) |
| A62C 2/06 | (2006.01) |
| A62C 3/08 | (2006.01) |
| B64D 27/26 | (2006.01) |
| B64D 45/00 | (2006.01) |

(Continued)

(52) U.S. Cl.
CPC ............... F02C 7/25 (2013.01); B64D 27/26 (2013.01); B64D 29/00 (2013.01); B64D 45/00 (2013.01);
(Continued)

(58) Field of Classification Search
CPC ........ B64D 2045/009; B64D 2027/264; B64D 45/00; F02C 7/24; F02C 7/25; F02C 7/28;
(Continued)

(56) References Cited

U.S. PATENT DOCUMENTS 5,524,846 A * 6/1996 Shine ............... B64D 27/00 244/121
5,910,094 A * 6/1999 Kraft ............... B64D 29/00 277/419

(Continued)

FOREIGN PATENT DOCUMENTS

| EP | 2543864 | 1/2013 |
| EP | 2957794 | 12/2015 |
| FR | 3001197 | 7/2014 |

OTHER PUBLICATIONS

French Search Report, dated Nov. 16, 2017, priority document.

*Primary Examiner* — Philip J Bonzell
*Assistant Examiner* — Tye William Abell
(74) *Attorney, Agent, or Firm* — Greer, Burns & Crain, Ltd.

(57) ABSTRACT

A fire seals system positioned in a corner of a region of attachment between a rear engine mount and a pylon and comprising a metal shoe comprising a fitting comprising two first vanes forming an L fixed in the corner and a lower second vane between the lower edges of the two first vanes and an upper second vane between the upper edges of the two first vanes, and a flexible tongue having a fixed upstream end and a free downstream end in which an intermediate part of the tongue is arranged between the lower second vane and the upper second vane, and a longilinear seal attached to a thrust reverser cowl with one end of the longilinear seal bearing against the tongue. Such a fire seals system makes it possible to limit the spread of flames and to absorb movements of the nacelle.

4 Claims, 3 Drawing Sheets

(51) Int. Cl.
  *F02C 7/20* (2006.01)
  *B64D 29/00* (2006.01)
(52) U.S. Cl.
  CPC ............... *F02C 7/20* (2013.01); *A62C 2/06* (2013.01); *A62C 3/08* (2013.01); *B64D 2027/264* (2013.01); *B64D 2045/009* (2013.01)
(58) Field of Classification Search
  CPC ..... A62C 2/06; A62C 3/08; F16J 15/02; F16J 15/065
  See application file for complete search history.

(56) References Cited

U.S. PATENT DOCUMENTS 10,571,025 B2 * 2/2020 Takeuchi ............... F16J 15/065
2012/0104162 A1 * 5/2012 West ..................... B64C 1/1453
   244/54
2013/0174572 A1 * 7/2013 Raison .................... B64C 7/02
   60/782
2014/0026582 A1 * 1/2014 Beilliard ................ B64D 29/00
   60/771
2014/0075948 A1 * 3/2014 Exner ..................... F02C 7/28
   60/726
2014/0262358 A1 * 9/2014 Livingston ............... A62C 3/08
   169/45
2015/0048202 A1 * 2/2015 Takeuchi ................. F02C 7/20
   244/54
2015/0360795 A1 * 12/2015 Livingston ............. B64D 45/00
   244/129.2
2015/0367947 A1 * 12/2015 Audart-Noel .......... B64D 45/00
   244/54
2017/0096940 A1 * 4/2017 Brice ...................... F02C 7/25
2018/0156129 A1 * 6/2018 Takeuchi ................. B64C 7/00

* cited by examiner

METAL FIRE SEALS SYSTEM FOR AIRCRAFT ENGINE MOUNT

CROSS-REFERENCES TO RELATED APPLICATIONS

This application claims the benefit of the French patent application No. 1752584 filed on Mar. 28, 2017, the entire disclosures of which are incorporated herein by way of reference.

TECHNICAL FIELD

The present invention relates to a fire seals system in which the seals are made in metallic materials and in which the seals system is arranged at the rear engine mount of an aircraft, and to an aircraft comprising such a seals system.

BACKGROUND OF THE INVENTION

FIG. 4 shows a region 400 of attachment between a rear engine mount 402 and a pylon 404 of an aircraft of the prior art.

The rear engine mount 402 is arranged between the pylon 404 and a structural element of a turbomachine and provides support for the turbomachine.

To this end, the rear engine mount 402 comprises a beam 406 attached to the pylon 404 and links 408a-b mounted with mobility in rotation on the beam 406 and in which each link 408a-b is fixed to the turbomachine.

The region 400 of attachment is delimited with respect to the outside by a thrust reverser cowl 410 (viewed in part section) and an access hatch 412 providing access to the rear engine mount 402.

In the event of a fire in the turbomachine, it is necessary to prevent flames from spreading to the pylon 404 and to the outside of the pylon 404. For this purpose, at the interface between the rear engine mount 402 and the pylon 404 the aircraft has a first seals system 450 between the access hatch 412 and the internal structure against which this hatch rests and a second seals system 460 between the thrust reverser cowl 410 and the internal structure against which this cowl rests.

The first seals system 450 takes the form of a series of metal tongues 452 arranged one after another along one edge of the access hatch 412.

The second seals system 460 comprises a longilinear seal 462 and a shoe 464. The longilinear seal 462 and the shoe 464 are made from special-purpose fire-resistant elastomeric materials.

The shoe 464 is fixed overall underneath the joint between the access hatch 412 and the thrust reverser cowl 410 and is compressed by the thrust reverser cowl 410 when the latter is set in place.

The longilinear seal 462 runs along and under the thrust reverser cowl 410 and is positioned in the shoe 464 which has a housing 466 designed for this purpose.

The shoe 464 is attached to the internal structure and the longilinear seal 462 is attached to the thrust reverser cowl 410.

Although such an arrangement is entirely satisfactory from a security standpoint, the compression of the shoe 464 by the thrust reverser cowl 410 may lead to deformations of these components and to premature wear of the shoe 464 in particular. Furthermore, because of the temperatures attained in this region, components made of elastomeric materials have a tendency to age rapidly and therefore require regular replacement.

SUMMARY OF THE INVENTION

It is an object of the present invention to propose a metal fire seals system that offers greater flexibility and better temperature withstand and therefore exhibits less wear.

To this end, the invention proposes a fire seals system configured to be positioned in a corner of a region of attachment between a rear engine mount and a pylon of an aircraft comprising a thrust reverser cowl, the fire seals system comprising:
- a metal shoe made with metal components and comprising:
  a fitting comprising, on the one hand, an upstream first vane and a lateral first vane forming an L fixed in the corner, in which each first vane presses against one of the flanks of the corner and, on the other hand, a lower second vane and an upper second vane in which the lower second vane extends at right angles to the first vanes and is attached to the lower edges thereof, and in which the upper second vane extends perpendicular to the first vanes and is attached to the upper edges thereof, and
  a flexible tongue, in bowed shape and which has an upstream end fixed upstream of the fitting and a free downstream end coming to bear against an element of the attachment region that is offset towards the outside with respect to the upstream first vane, in which an intermediate part of the tongue, between the upstream end and the downstream end, is arranged between the lower second vane and the upper second vane, and
  a longilinear seal configured to be attached to the thrust reverser cowl and of which one end comes to bear against the tongue.

Such an arrangement makes it possible to provide a barrier against the spread of flames seeking to spread from the turbomachine towards the pylon and to absorb movements of the nacelle, particularly as a result of the chicane effect created by the metal elements.

Advantageously, the tongue has a lower plate and an upper plate which are made of metal and attached to the downstream end, the lower plate extends from the downstream end against the upper face of the lower second vane and the upper plate extends from the downstream end against the lower face of the upper second vane.

Advantageously, the fire seals system comprises a metal profile which has a central flank which extends between the lower plate and the upper plate, and two lateral flanks, in which one of the lateral flanks extends the central flank beyond the lower plate and in which the other lateral flank extends the central flank beyond the upper plate.

The invention also proposes an aircraft comprising a rear engine mount, a pylon, a thrust reverser cowl, a region of attachment between the rear engine mount and the pylon, which region is delimited by the thrust reverser cowl and has a corner, and a fire seals system according to one of the above alternative forms.

BRIEF DESCRIPTION OF THE DRAWINGS

The abovementioned features of the invention, together with others, will become more clearly apparent from reading the following description of an exemplary embodiment, the description being given in relation to the attached figures among which.

DETAILED DESCRIPTION OF THE PREFERRED EMBODIMENTS

Figure 1:
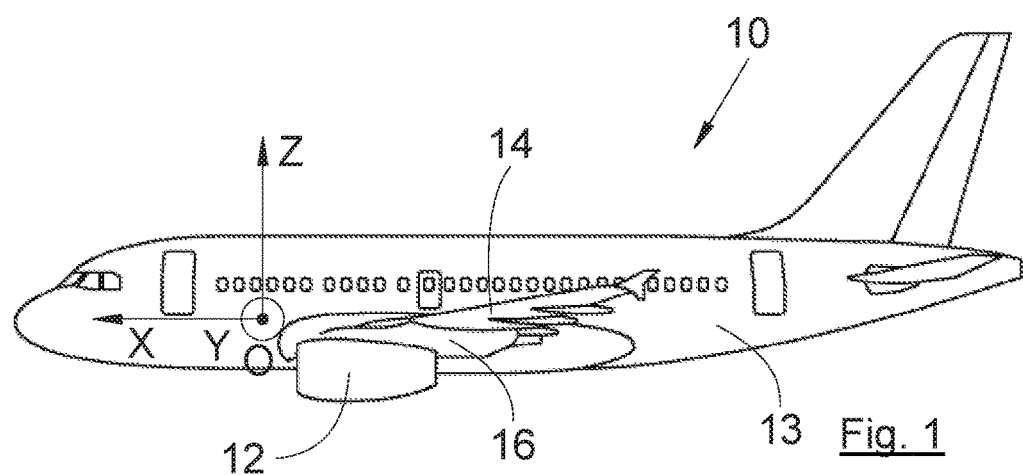
FIG. 1 is a side view of an aircraft comprising a seals system according to the invention.

In the description which follows, terms relating to a position are considered with reference to an aircraft in a position of forward travel, namely as depicted in FIG. 1.

FIG. 1 shows an aircraft 10 which has a nacelle 12 in which a turbomachine is housed.

In the description which follows, and by convention, the longitudinal axis of the aircraft 10 oriented positively in the direction of forward travel of the aircraft 10 is referred to as X, the transverse direction which is horizontal when the aircraft is on the ground is referred to as Y, and the vertical direction or vertical height when the aircraft is on the ground is referred to as Z, these three directions X, Y and Z being mutually orthogonal.

In the embodiment of the invention depicted in FIG. 1, the aircraft 10 comprises a fuselage 13 and a wing 14 on each side of the fuselage 13. Under each wing 14 the aircraft 10 has a pylon 16 which is fixed to the structure of the wing 14 and extends under the wing 14. Each pylon 16 supports a turbomachine which is fixed to the pylon 16 by a front engine mount and a rear engine mount.

Figure 2:
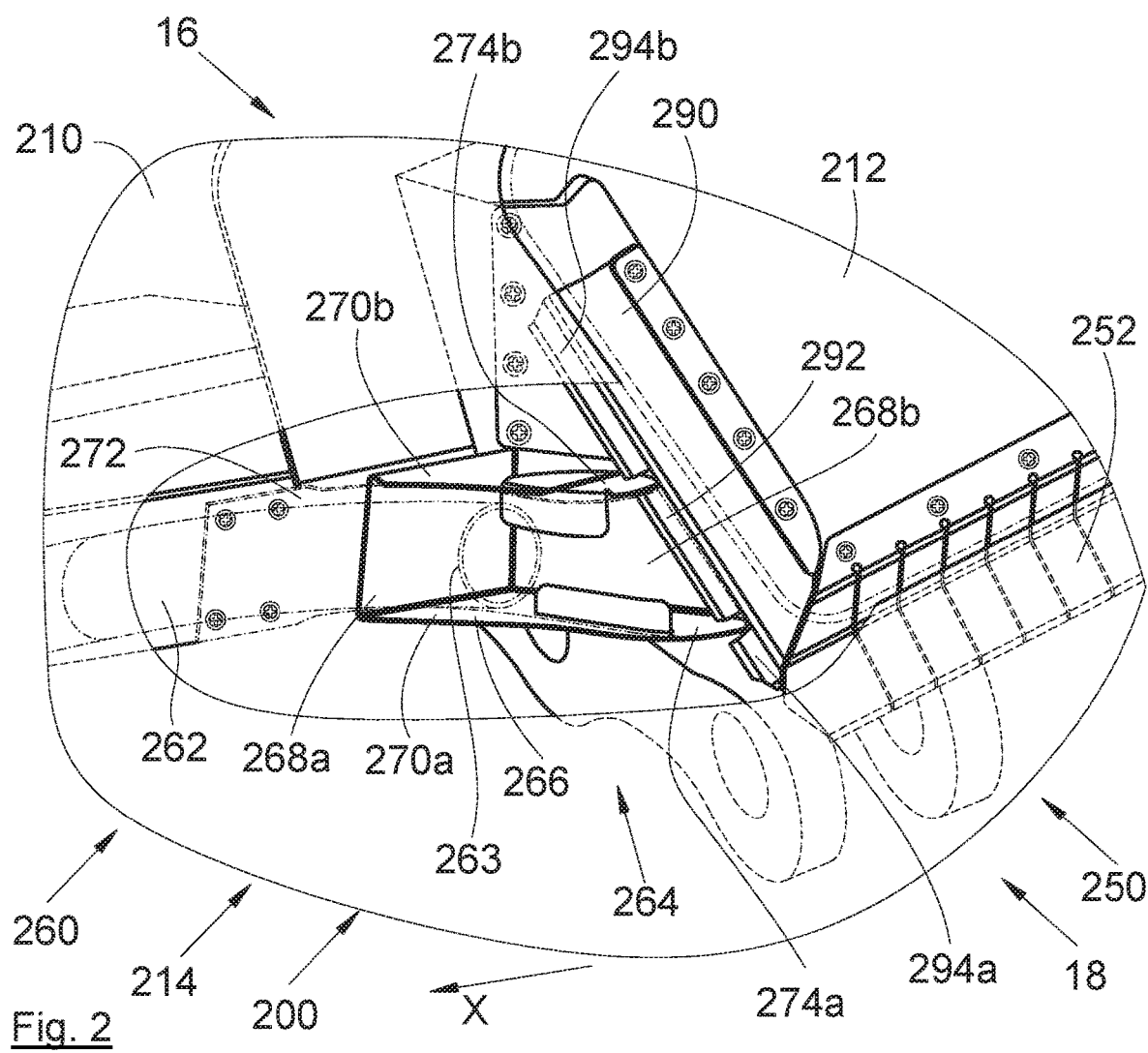
FIG. 2 is a perspective view of a region of attachment with a seals system according to the invention.
Figure 3:
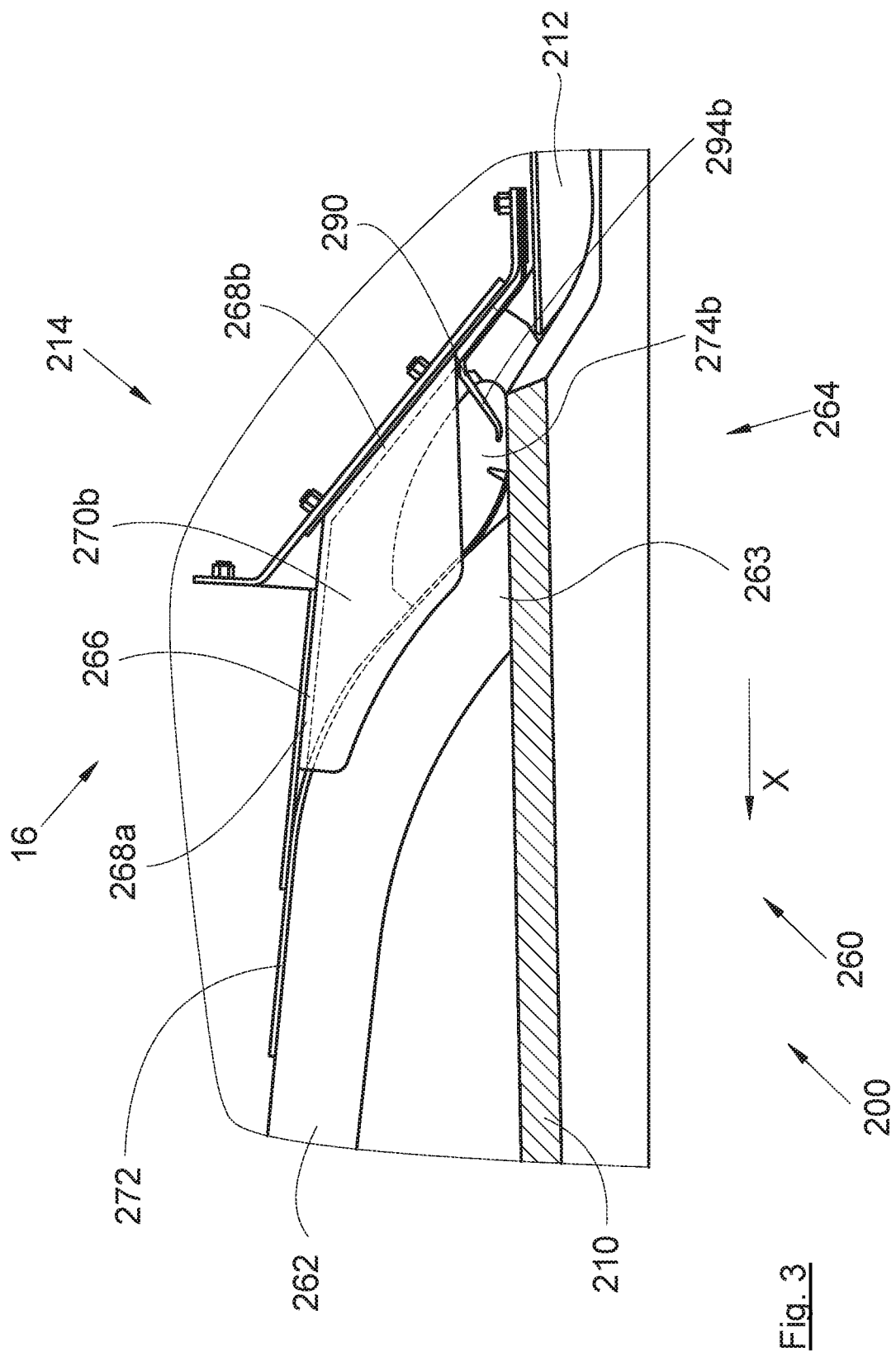
FIG. 3 is a view of the attachment region of FIG. 2 from above.
Figure 4:
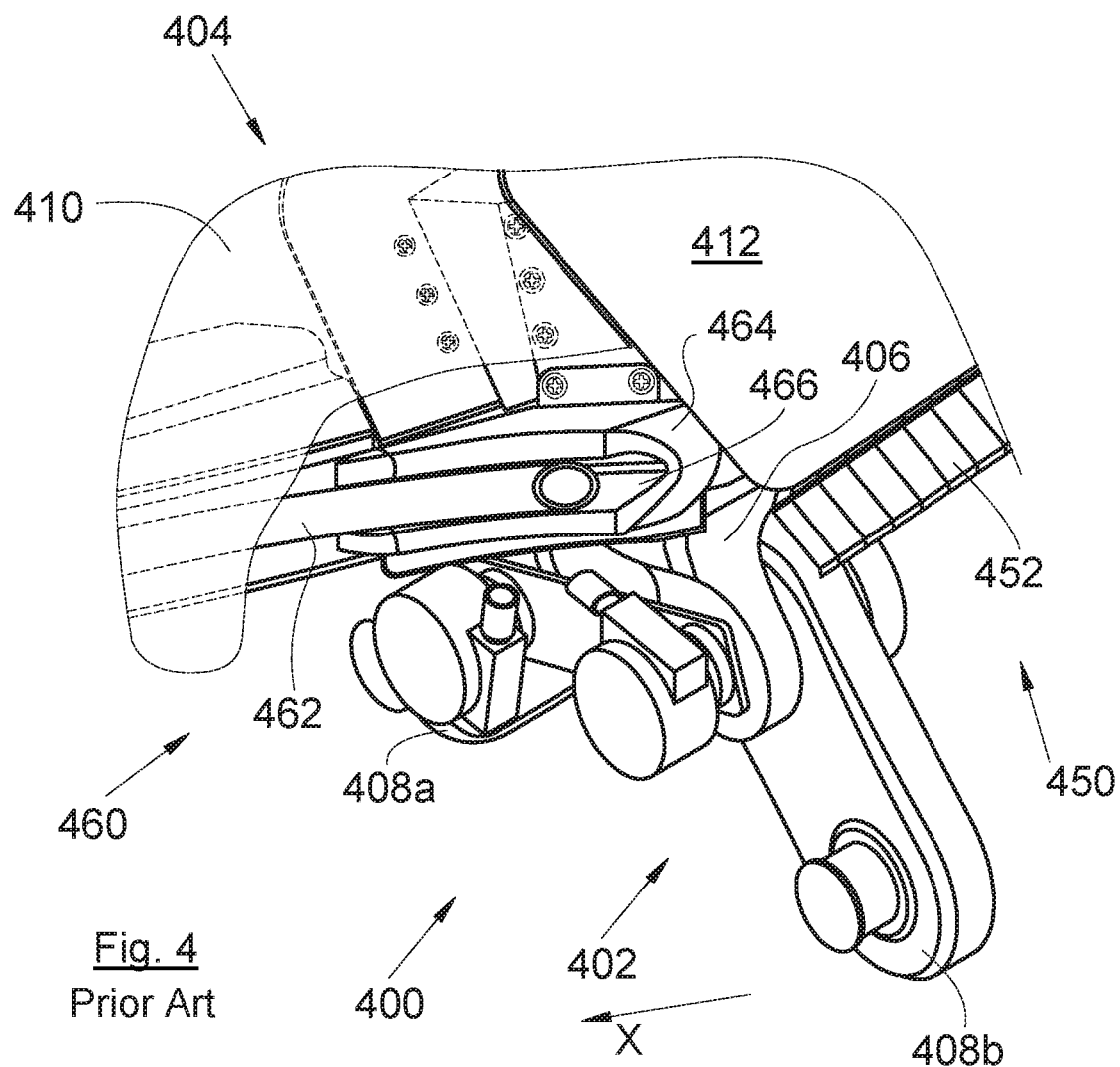
FIG. 4 is a perspective view of an attachment region of the prior art.

FIG. 2 shows a region 200 of attachment between a rear engine mount 18 and the pylon 16 of the aircraft 10. FIG. 3 shows the attachment region 200 in a view from above.

The rear engine mount 18 and the pylon 16 are similar to those of the prior art and the same description applies here.

Just as in the prior art, the aircraft 10 comprises a thrust reverser cowl 210 (viewed in part section) and an access hatch 212 (viewed as transparent and indicated by fine chain line) providing access to the rear engine mount 18. The thrust reverser cowl 210 and the access hatch 212 form part of the nacelle 12.

The thrust reverser cowl 210 and the access hatch 212 demarcate the region of attachment 200 with respect to the outside.

At the attachment region 200, under the joint between the thrust reverser cowl 210 and the access hatch 212, the structure of the pylon 16 forms a corner 214 which is open towards the outside because of a widening of the structure downstream and under the thrust reverser cowl 210 and the access hatch 212.

In order to prevent the spread of flames in the event of a turbomachine fire, the aircraft has a first fire seals system 250 between the access hatch 212 and the internal structure against which it rests and a system of metal fire seals 260 according to the invention between the thrust reverser cowl 210 and the internal structure against which it rests.

The fire seals systems 250 and 260 make it possible to demarcate regions of confinement inside each of which any fire that may break out remains contained.

The first seals system 250 is identical to that of the prior art and adopts the form of a series of metal tongues 252 arranged one after the other along an edge of the access hatch 212.

The metal seals system 260 comprises a longilinear seal 262 (viewed as transparent in FIG. 2) and a metal shoe 264. The longilinear seal 262 is made from special-purpose fire-resistant elastomeric materials and is similar to that of the prior art. The longilinear seal 262 runs along and under the thrust reverser cowl 210 and is attached to the thrust reverser cowl 210.

The difference between the arrangement of the prior art and the arrangement according to the invention lies in the makeup of the metal shoe 264.

The metal shoe 264 is made up of metallic components and comprises a metallic fitting 266 comprising an upstream first vane 268a and a lateral first vane 268b forming an L. The fitting 266 is fixed in the corner 214 and each first vane 268a-b presses against one of the flanks of the corner 214. The two first vanes 268a-b are vertical overall, the upstream first vane 268a in a plane roughly parallel to the longitudinal axis X and the lateral first vane 268b in a plane roughly parallel to the transverse axis Y. The upstream first vane 268a extends from the solid angle of the corner 214 in the upstream direction and the lateral first vane 268b extends from the solid angle of the corner 214 outwards.

The fitting 266 also comprises a lower second vane 270a and an upper second vane 270b. The lower second vane 270a extends perpendicular to the first vanes 268a-b and is attached to the lower edges thereof. The upper second vane 270b extends perpendicular to the first vanes 268a-b and is attached to the upper edges thereof. The two second vanes 270a-b are horizontal overall.

The metal shoe 264 also comprises a flexible and metal tongue 272 (viewed as transparent in FIG. 2) which has an upstream end which is fixed and a downstream end which is free, which means to say, not fixed.

In the embodiment of the invention depicted in FIGS. 2 and 3, the upstream end is fixed by screws to the structure of the pylon 16 but in another embodiment, it could be fixed to the upstream first vane 268a as an upstream extension thereof. The upstream end is fixed upstream of the fitting 266.

The downstream end comes to bear against an element of the attachment region 200 which element is offset towards the outside with respect to the upstream first vane 268a, which means to say that the downstream end is offset towards the outside with respect to the plane against which the upstream end is fixed. This offset dictates the position of the tongue 272 which adopts a bowed shape with the center of curvature positioned upstream and on the outside with respect to the tongue 272.

The longilinear seal 262 has one end 263 that comes to bear against the outwardly oriented face of the tongue 272, thereby applying pressure to the tongue 272 and pushing it back towards the corner 214 and ensuring good contact between the longilinear seal 262 and the tongue 272. The butting of the downstream end of the tongue 272 prevents this downstream end from being pushed in or away from the thrust reverser cowl 210.

As FIG. 3 shows, the tongue 272 is configured to have, between the upstream end and the downstream end, an intermediate part which is arranged between the lower second vane 270a and the upper second vane 270b.

Such an arrangement makes it possible to create a barrier against the spread of flames seeking to spread from the turbomachine towards the pylon 16 by creating chicanes.

Furthermore, the flexibility of the tongue 272 allows it to come to bear on the outside against the thrust reverser cowl 210 and absorb movements of the nacelle 12.

In order to afford better protection against the spread of flames at the downstream end of the tongue 272 between the thrust reverser cowl 210 and the fitting 266, the tongue 272 has a lower plate 274a and an upper plate 274b which are metal and attached to the downstream end, for example, by riveting.

The lower plate 274a and the upper plate 274b run parallel to the second vanes 270a-b and fill any spaces there might be between the thrust reverser cowl 210 and the fitting 266, and, more particularly, the second vanes 270a-b.

The upper plate 274b extends from the downstream end against the lower face of the upper second vane 270b, namely on the inside of the fitting 266.

The lower plate 274a extends from the downstream end against the upper face of the lower second vane 270a, namely on the inside of the fitting 266.

To ensure continuity of the protection against the spread of flames using the first seals system 250, the seals system 260 has a metal profile 290 which is fixed to the internal structure, particularly to the structural element that bears the access hatch 212.

In the invention embodiment depicted in FIGS. 2 and 3, the metal profile 290 also constitutes the element of the attachment region 200 which is offset and against which the downstream end of the tongue 272 comes to bear. However, it is equally possible to plan for a structural element of the pylon 16, particularly the structural element that bears the access hatch 212, to constitute the element against which the downstream end of the tongue 272 comes to bear.

The metal profile 290 has a central flank 292 which extends between the lower plate 274a and the upper plate 274b, as well as two lateral flanks 294a-b, in which one of the lateral flanks 294a extends the central flank 292 beyond the lower plate 274a and in which the other lateral flank 294b extends the central flank 292 beyond the upper plate 274b.

Between the central flank 292 and each lateral flank 294a-b, the metal profile 290 has a notch in which the corresponding lower plate 274a or upper plate 274b becomes positioned.

By means of its central flank 292, the metal profile 290 thus becomes inserted between the downstream end of the tongue 272 and the upstream first vane 268a, thus making it possible to create a barrier to the spread of flames.

The tongue 272 and the metal tongues 252 and the metal profile 290 are advantageously made of spring steel to make them flexible and allow them to tolerate the relative movements between strut and nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fire seals system configured to be positioned in a corner of a region of attachment between a rear engine mount and a pylon of an aircraft comprising a thrust reverser cowl, the fire seals system comprising:
 a metal shoe made with metal components and comprising:
  a fitting comprising
   an upstream first vane and a lateral first vane forming an L fixed in the corner, in which each of the upstream first vane and the lateral first vane presses against a flank forming the corner, and
   a lower second vane and an upper second vane, in which the lower second vane extends at right angles to the upstream first vane and the lateral first vane and is attached to lower edges of the upstream first vane and the lateral first vane, and in which the upper second vane extends perpendicular to the upstream first vane and the lateral first vane and is attached to upper edges of the upstream first vane and the lateral first vane, and
  a flexible tongue, having a bowed shape and having an upstream end fixed upstream of the fitting and a free downstream end bearing against an element of the region of attachment that is offset towards an outside with respect to the upstream first vane, in which an intermediate part of the tongue, between the upstream end and the downstream end, is arranged between the lower second vane and the upper second vane, and
 a longilinear seal configured to be attached to the thrust reverser cowl and of which one end comes to bear against the tongue.

2. The fire seals system according to claim 1, wherein the tongue has a lower plate and an upper plate which are each made of metal and attached to the downstream end of the tongue, wherein the lower plate extends from the downstream end against an upper face of the lower second vane and wherein the upper plate extends from the downstream end against a lower face of the upper second vane.

3. The fire seals system according to claim 2, further comprising a metal profile having a central flank extending between the lower plate and the upper plate, and two lateral flanks, wherein one of the lateral flanks extends the central flank beyond the lower plate and wherein the other lateral flank extends the central flank beyond the upper plate.

4. An aircraft comprising a rear engine mount, a pylon, a thrust reverser cowl, a region of attachment between the rear engine mount and the pylon, which region is delimited by the thrust reverser cowl and has a corner, and a fire seals system according to claim 1.

* * * * *